W. R. JEAVONS.
COOKING DEVICE.
APPLICATION FILED FEB. 15, 1912.
1,210,479.
Patented Jan. 2, 1917.
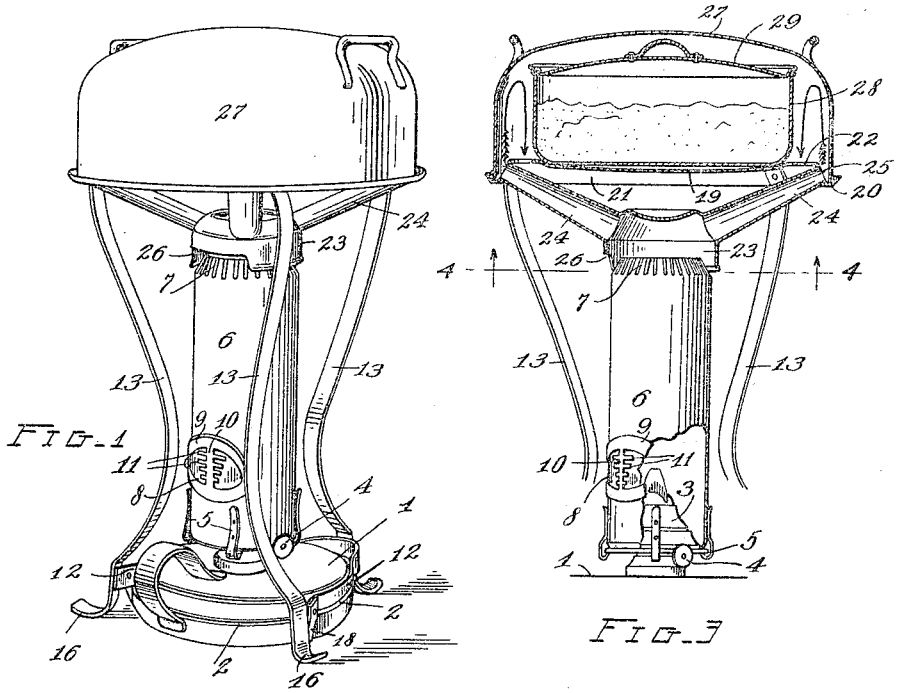

UNITED STATES PATENT OFFICE.

WILLIAM R. JEAVONS, OF CLEVELAND, OHIO.

COOKING DEVICE.

1,210,479. Specification of Letters Patent. Patented Jan. 2, 1917.

Application filed February 15, 1912. Serial No. 677,800.

*To all whom it may concern:*

Be it known that I, WILLIAM R. JEAVONS, a citizen of the United States, residing at Cleveland, in the county of Cuyahoga and State of Ohio, have invented a certain new and useful Improvement in Cooking Devices, of which the following is a full, clear, and exact description, reference being had to the accompanying drawings.

This invention relates to cooking devices, and more especially to devices or attachments which are adapted to utilize the heat ascending in a more or less well defined vertical column, as from the chimney or drum of a lamp or lamp stove.

It is the general object of this invention to provide a device which will, with a comparatively low heat extending over a long period of time, effectively and thoroughly cook certain articles, as cereals, without danger of burning or scorching the same, and without liability, on the one hand, of fermentation and, on the other hand, or disintegrating the grains or kernels of the cereal.

A further object of the invention is to provide a device, in the nature of an attachment to be used with heaters of the character referred to, which is particularly adapted for the support of the utensil containing the article to be cooked and for the proper distribution of the heated gases thereto and thereabout.

A still further object of the invention is to provide, as a part of the device, a special construction of heater and specially coöperating features of such heater and attachment.

Further objects of the invention will appear from the description and claims, with particular reference to the drawings hereof, wherein, Figure 1 represents a perspective view of a complete heating and cooking device constructed in accordance with the invention; Fig. 2 a plan view of the said device with the cover and cooking utensil removed; Fig. 3 a view, partly in section and partly in elevation, of the device shown in Fig. 1, said figure corresponding substantially to the line 3—3 of Fig. 2; Fig. 4 a sectional view corresponding to the line 4—4 of Fig. 3, looking in the direction of the arrows, and Fig. 5 a sectional detail showing the base of the device.

The invention shown herein is in the nature of a particular application of the method and broad principles disclosed in my copending application Ser. No. 677,799 filed herewith.

Describing the various parts by reference characters, 1 denotes the font of a heating stove, which is preferably of the lamp-stove type. This font may be of any desired size and capacity and is preferably provided, between the top and bottom thereof, with an outwardly projecting flange 2, the purpose of which will be described hereinafter.

3 denotes the burner generally, the burner shown herein being of the lamp type, and having a wick raiser 4 and a gallery 5 on which is seated a chimney 6. The chimney shown herein is substantially cylindrical in shape, having its upper end somewhat contracted, as shown at 7. The chimney will preferably be of sheet metal and is provided with a window 8, the lower end of which is about flush with the top of the burner 3. The window comprises a sheet of transparent material, as mica, mounted in a frame 9, and is provided with an indicator consisting of a vertical strip 10 connecting the top and bottom of the frame and having a horizontal series of spaced lateral projections 11, which projections constitute an indicator, whereby the heat delivered from the chimney may be regulated in accordance with varying conditions of use, the amount of heat being dependent upon the amount of flame and such heat being determined by bringing the top of the flame to the height of the desired lateral projection 11.

With the heater thus described, there is employed a special form of appliance or attachment for utilizing in a very efficient manner the heat contained within and liberated by the vertical column of air and products of combustion discharged from the top of the chimney. This attachment comprises generally a supporting base for the heating device and a vessel support and heat distributer supported above the base in operative relation to the top of the chimney. The base shown herein consists of a horizontally extending strap 12, which is connected to the three vertical legs 13 of the attachment. The strap is of general U-shape in plan view to provide an opening for the lateral insertion of the font therein and to conform throughout the major portion of its extent to the vertical surface of the font. The strap is connected with the legs 13 by rivets extending through said legs and through outwardly projecting portions 14 and 15 of said strap. The lower ends of the legs are bent outwardly, as shown at 16 to provide feet for the support of the heating device and the heating and cooking attachment.

A bottom support for the font is conveniently formed by means of a strap 17 connected to one of the legs 13 and to a strap 18 extending transversely with respect to the strap 17 and connected with the strap 12, as by means of rivets. The straps 17 and 18 constitute a seat for the bottom of the font 1, and the parts are so proportioned that, when the font is in place, the flange 2 thereof will lie immediately beneath the strap 12, as shown in Fig. 1 and as indicated in dotted lines in Fig. 5.

19 denotes a plate, preferably circular in shape and provided near its periphery with an annular seat 20, of general trough or V-shape. This seat is connected with the main body of the plate by a downwardly and outwardly inclined flange 21, and the main body of the plate is provided with a circular series of apertures 22 which are preferably located immediately adjacent to the upper end of this flange.

Below the central portion of the plate 19 is located a collecting hood 23, said hood having an open bottom and closed top and being provided with a plurality of upwardly inclined tubes 24 leading from the upper portion thereof and connected to and discharging through apertures 25 formed in the flange 21. Four such tubes are shown, but it is obvious that the number and dimensions of these tubes may be varied to suit varying constructions and varying incidents of use. The lower portion or skirt of the hood 23 is cut away, as shown at 26, to correspond to the lateral opening provided in the base and to permit the upper end of the chimney 6 to pass under said hood as the font is slid into place on its seat in said base.

With the construction as thus far described, it will be apparent that the products of combustion and heated air arising through the chimney 6 will be discharged into the hood 23 and will be distributed by the pipes 24 through the inclined flange 21 at points located outside of the apertures 22. For the purpose of collecting and distributing the gases discharged through the tubes 24 the hood 27 is provided, the said hood being preferably of the shape shown in the drawing and having a rounded top and substantially a cylindrical side. The particular article to be cooked will be placed within an open top vessel 28 having a cover 29 and being of such dimensions as to provide with the hood a space surrounding said vessel and through which space the gases will circulate prior to being discharged through the apertures 22. As will appear more especially by reference to Fig. 3, the gases discharged through the tubes 24 rise adjacent to the wall of the hood 27, collect in the top of the hood about the utensil 28 and gradually submerge the same, after submergence escaping through the apertures 22, the flow of gases being indicated by the arrows. By this distribution of gases, the cereal in the upper part of the utensil will be heated to a somewhat higher temperature than that at the bottom, which will permit the sereal to be cooked for a long period of time at a temperature as low as one hundred fifty degrees Fahrenheit without souring or fermenting, and on the other hand will allow the use of a temperature as high as one hundred ninety degrees Fahrenheit without disintegrating the grains or kernels.

A device of the character set forth herein, while comparatively simple and economical of production, has proven to be of great value and efficiency in cooking various articles, especially cereals. Owing to the efficient distribution of the heated gases about the cooking vessel, the cooking of these articles can be accomplished at a very slight fuel cost. By means of the indicator projections 11, the height of the flame and the consequent amount of heat can be readily varied to adapt the device to the requirements of various articles of food.

Having thus described my invention, what I claim is:

1. The combination, with the chimney of a lamp or stove, of a hood arranged to receive the heated air and products of combustion from said chimney, a plurality of tubes extending upwardly from and communicating with the interior of said hood, a vessel support carried by said tubes, and a hood removably applied to said vessel support and adapted to receive the gases discharged through said tubes, there being apertures provided in said support for the escape of such gases.

2. The combination, with the chimney of a lamp or stove, of an open bottom hood arranged to receive the gases arising from said chimney, a plurality of tubes extending upwardly and outwardly from said hood, a vessel support mounted on said tubes and provided with apertures for the discharge ends of said tubes, said support being provided with an annular seat located outside of said apertures and being provided with a series of discharge apertures located adjacent to the former apertures and between the same and the central portion of said support, and a hood removably applied to said seat.

3. The combination, with the chimney of a lamp or stove, of a hood arranged to receive the gases arising from said chimney, a plurality of tubes extending upwardly and outwardly from said hood, a vessel support comprising a plate having a downwardly and outwardly inclined flange provided with apertures registering with the discharge ends of said tubes, there being an annular seat provided outside of said flange and said plate being provided with a series of discharge apertures located adjacent to the upper end of said flange, and a hood removably applied to said seat.

4. The combination, with a lamp or stove, of a hood arranged to receive the gases arising from said lamp or stove, a plurality of tubes extending from said hood, a vessel support comprising a plate provided with apertures registering with the discharge ends of said tubes, there being an annular seat provided outside of said apertures and said plate being provided with a series of discharge apertures located within said seat, and a hood removably applied to said seat.

5. The combination, with the chimney of a lamp or stove, of an open bottom hood having a portion of its lower end removed and arranged to receive the gases arising from said chimney, a plurality of tubes extending upwardly and outwardly from said hood, a vessel support provided with apertures with which the upper ends of said tubes register and with a series of discharge apertures, a hood removably applied to said support and adapted to receive the gases discharged from said tubes, and a base having an opening corresponding to the removed portion of the first mentioned hood for the insertion of a lamp or stove.

6. In a device of the character set forth, the combination, with the chimney of a lamp or stove, of a plate having a central vessel supporting portion and provided, outside such portion, with a series of discharge apertures and with a series of apertures located outside of and below the first mentioned apertures and provided with a seat for a hood located outside of the second series of apertures, tubes communicating with the second series of apertures, means for supplying heated gases from the chimney through said tubes, and a removable hood for said seat.

7. In a device of the character set forth, the combination, with the chimney of a lamp or stove, of a plate having a central vessel supporting portion and provided, outside such portion, with a series of discharge apertures and a series of receiving apertures and having a seat for a hood located outside of said apertures, tubes communicating with the second series of apertures, means for supplying heated gases from the chimney through said tubes, and a removable hood for said seat.

8. In a device of the character set forth, the combination of a heat distributing device, a base in operative relation to said device, said base being provided with a substantially horizontal font support and with a strap located above and spaced from said support, said support and said strap each having a lateral opening for a font body, and a heating device having a font provided with an outwardly projecting flange arranged to pass beneath and in proximity to said strap when the font is applied to said seat.

9. In a device of the character set forth, the combination of a heat distributing device, a font seat therebelow, said seat comprising a substantially U-shaped strap, a font seat located below and spaced from said strap and having a lateral opening registering with the open end of said strap, a font slidably supported on said seat and provided with an outwardly projecting flange projecting beneath and adapted to be engaged by said strap, and legs connecting said strap and said heat distributing device.

10. In a device of the character set forth, the combination of a base having a font seat provided with a lateral opening, a heat distributing device above said base, and a hood having its lower portion removed to correspond to said lateral opening and provided with a plurality of tubes discharging into said distributing device.

11. In a device of the character set forth, the combination, with the chimney of a lamp or stove, of a heat distributing device, a hood having a lateral opening near its lower end and provided with a plurality of tubes arranged to discharge into said distributing device, and a support beneath the hood along which the lamp or stove is adapted to be moved thereby to bring the top of the chimney through the lateral opening in the hood and thereby beneath said hood.

12. In a device of the character set forth, the combination of a base having a font seat provided with a lateral opening, a hood above said seat having a lateral opening in its lower portion corresponding to the former opening, a lamp having a font adapted to enter the seat and a chimney adapted to enter the opening in the hood, a distributing device above said hood, and tubes extending upwardly from said hood and discharging into said device.

13. In a device of the character set forth, the combination, with the chimney of a lamp or stove, of a vessel support, a vessel thereon, a hood removably mounted upon said support and coöperating therewith to form an inclosure for the vessel, and means for circulating heated gases from said chimney upwardly between the vessel and the wall of the hood and adjacent to said wall and downwardly adjacent to the vessel, whereby the hottest gases are collected above the vessel without first impinging upon the bottom of the vessel and the cooler gases are discharged from a point adjacent to but beneath the vessel.

14. In a device of the character set forth, the combination, with the chimney of a lamp or stove, of a vessel support, a hood removably mounted upon and coöperating with said support to form an inclosure for a vessel, and means for circulating heated gases from said chimney upwardly adjacent to the wall of said hood and downwardly between such wall and the central portion of the chamber.

15. In a device of the character set forth, the combination, with the chimney of a lamp or stove, of a vessel support, a hood coöperating with said support to form a chamber, and means for supplying heated gases from said chimney upwardly adjacent to the wall of the hood and for discharging the same from points near the bottom of the chamber and toward the center of the chamber with respect to the flow of the entering gases.

16. In a device of the character set forth, the combination, with the chimney of a lamp or stove, of a vessel support, a vessel thereon, a hood coöperating with said support to form a chamber therewith, means for supplying heated gases from said chimney to the chamber in a plurality of upwardly flowing streams at points remote from the vessel, and means for discharging the gases thus admitted at points adjacent to the bottom of the vessel, whereby the heated gases are collected above the vessel and the vessel is submerged in such gases with the top of the vessel subjected to the highest temperature of such gases.

In testimony whereof, I hereunto affix my signature in the presence of two witnesses.

WILLIAM R. JEAVONS.

Witnesses:
J. B. HULL,
BRENNAN B. WEST.

Copies of this patent may be obtained for five cents each, by addressing the "Commissioner of Patents, Washington, D C."